United States Patent [19]
House et al.

[11] Patent Number: 5,875,322
[45] Date of Patent: Feb. 23, 1999

[54] MAKING A CONTROL AVAILABLE TO A COMPUTER WITHOUT INSTALLING THE CONTROL

[75] Inventors: Daniel Edward House, San Jose; Constance Jane Nelin, Monte Sereno, both of Calif.

[73] Assignee: International Business Machines Corporation, Armonk, N.Y.

[21] Appl. No.: 828,990

[22] Filed: Mar. 31, 1997

[51] Int. Cl.[6] .................................................. G06F 9/00
[52] U.S. Cl. ............... 395/561; 395/200.49; 395/200.59; 707/1
[58] Field of Search ......................... 395/200.33, 200.31, 395/200.49, 200.59, 561; 707/1

[56] References Cited

U.S. PATENT DOCUMENTS

| | | | |
|---|---|---|---|
| 4,972,367 | 11/1990 | Burke | 707/10 |
| 5,168,441 | 12/1992 | Onarheim et al. | 364/146 |
| 5,179,698 | 1/1993 | Bachman et al. | 707/4 |
| 5,193,182 | 3/1993 | Bachman et al. | 707/100 |
| 5,193,183 | 3/1993 | Bachman | 707/1 |
| 5,195,178 | 3/1993 | Krieger et al. | 345/347 |
| 5,241,645 | 8/1993 | Cimral et al. | 395/500 |
| 5,249,300 | 9/1993 | Bachman et al. | 707/104 |
| 5,548,724 | 8/1996 | Akizawa et al. | 395/200.03 |
| 5,548,726 | 8/1996 | Pettus | 395/200.09 |
| 5,708,780 | 1/1998 | Levergood et al. | 395/200.12 |
| 5,708,825 | 1/1998 | Sotomayor | 385/762 |
| 5,732,216 | 3/1998 | Logan et al. | 395/200.33 |
| 5,737,592 | 4/1998 | Nguyen et al. | 395/604 |

*Primary Examiner*—Krisna Lim
*Attorney, Agent, or Firm*—Merchant, Gould, Smith, Edell, Welter, & Schmidt

[57] ABSTRACT

A method, apparatus, and article of manufacture for providing a programming development environment that supports the development of controls that may be executed in a computer connected to an Internet or Intranet, without the requirement that the controls be installed on the server. This is accomplished by encapsulating the data needed to execute the control without installing the control as objects in an application file storing the entire software project. The application file is copied to a data storage device of the server, which in turn retrieves the application file, accesses the objects containing the data needed to execute the control without installing the control, and then processes the data to execute the control.

21 Claims, 7 Drawing Sheets

MAKING A CONTROL AVAILABLE TO A COMPUTER WITHOUT INSTALLING THE CONTROL

CROSS-REFERENCE TO RELATED APPLICATIONS

This application is related to the following co-pending and commonly-assigned patent applications:

Application Ser. No. 08/828,854, entitled "PROGRAMMING DEVELOPMENT ENVIRONMENT FOR INTRANET AND INTERNET APPLICATIONS EMPLOYING UNIQUE PROJECT DATA STRUCTURE," Mar. 31, 1997, by Daniel E. House, Brian J. Owings, and Shiau-Shiau Pei;

Application Ser. No. 08/828,476, entitled "SHARED OBJECT MODEL," Mar. 31, 1997, by Brian J. Owings, Shiau-Shiau Pei, and Daniel E. House;

Application Ser. No. 08/828,480, entitled "REMOTE SCRIPTING OF LOCAL OBJECTS," Mar. 31, 1997, by Daniel E. House, Constance J. Nelin, and Rebecca B. Nin;

Application Ser. No. 08/828,989, entitled "METHOD AND APPARATUS FOR SIMULATING A MULTI-TIERED COMPUTER ENVIRONMENT," Mar. 31, 1997, by Daniel E. House and Constance J. Nelin;

Application Ser. No. 08/828,478, entitled "MULTI-TIER VIEW PROJECT WINDOW," Mar. 31, 1997, by Howard J. Glaser, Daniel E. House, and Constance J. Nelin;

Application Ser. No. 08/829,104, entitled "EXTENDER USER INTERFACE," Mar. 31, 1997, by Thomas E. Conrad, Howard J. Glaser, Jean C. Ho, James L. Keesey, Constance J. Nelin, and Gerold J. Wilmot;

Application Ser. No. 08/828,846, entitled "SHARED MODULES GRAPHICAL USER INTERFACE," Mar. 31, 1997, by Howard J. Glaser, Daniel E. House, and Constance J. Nelin;

Application Ser. No. 08/828,479, entitled "QUERY SELECTION FOR A PROGRAM DEVELOPMENT ENVIRONMENT," Mar. 31, 1997, by Howard J. Glaser and Mary C. Lehner;

Application Ser. No. 08/828,477, entitled "DOCKING AND FLOATING MENU/TOOL BAR," Mar. 31, 1997, by Howard J. Glaser, Stewart E. Nickolas, and Karl D. Johnson;

Application Ser. No. 08/828,890, entitled "HTML INTEGRATION UTILITY FOR A PROGRAM DEVELOPMENT ENVIRONMENT," Mar. 31, 1997, by Howard J. Glaser;

Application Ser. No. 08/828,897, entitled "EXTENDER SMART GUIDE," Mar. 31, 1997, by Howard J. Glaser; and Application Ser. No. 08/828,481, entitled "MULTI-TIER DEBUGGING," Mar. 31, 1997, by Daniel E. House and Constance J. Nelin;

all of which applications are incorporated by reference herein.

BACKGROUND OF THE INVENTION

1. Field of the Invention

This invention relates in general to programming development environments performed by computers, and in particular, to the use of a programming development environment for Internet and Intranet applications.

2. Description of Related Art

With the fast growing popularity of the Internet and Intranets, especially Web-based networks, there is also a fast growing demand for Internet and Intranet access to databases. However, it is especially difficult to use relational database management system (RDBMS) software with Web-based networks. One of the problems with using RDBMS software with Web-based networks is the lack of programming development environments that can be used to develop both Web-based and RDBMS-based applications.

For example, Web-based networks operate using the HyperText Transfer Protocol (HTTP) and the HyperText Markup Language (HTML). HTTP is the protocol used by Web clients and Web servers to communicate between themselves using these hyperlinks. HTML is the language used by Web servers to create and connect together documents that contain these hyperlinks. This protocol and language results in the communication and display of graphical information that incorporates hyperlinks. Hyperlinks are network addresses that are embedded in a word, phrase, icon or picture that are activated when the user selects a highlighted item displayed in the graphical information.

In contrast, most RDBMS software uses a Structured Query Language (SQL) interface. The SQL interface has evolved into a standard language for RDBMS software and has been adopted as such by both the American Nationals Standard Organization (ANSI) and the International Standards Organization (ISO).

Thus, there is a need in the art for methods of accessing RDBMS software across an Internet or Intranet, and especially via Web-based networks. Further, there is a need for simplified development environments for such systems.

SUMMARY OF THE INVENTION

To overcome the limitations in the prior art described above, and to overcome other limitations that will become apparent upon reading and understanding the present specification, the present invention discloses a method, apparatus, and article of manufacture for providing a programming development environment that supports the development of Internet and Intranet applications. More specifically, the present invention provides for the dynamic discovery of controls by servers, without the requirement that the controls be installed on the server. This is accomplished by encapsulating the executable programming logic for the control as an object in an application file storing the entire software project. The application file is copied to a data storage device of the server, which in turn retrieves the application file, accesses the object containing the executable programming logic, and then executes the executable programming logic.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural and functional changes may be made without departing from the scope of the present invention.

Overview

The present invention comprises a computer-implemented Rapid Application Development (RAD) tool for constructing client-server applications for a three tier computer network architecture. The RAD tool provides an Integrated Development Environment (IDE) that is used to design, develop, deploy, and debug computer programming that accesses and displays data quickly and easily on the three tier computer network. Moreover, the RAD tool is extremely easy to use, yet powerful.

The RAD tool of the present invention is primarily targeted to enterprise customers. The fact that an application is produced quickly does not mean that the application is non-critical. The applications constructed using the RAD tool are primarily oriented towards data access, data manipulation and data rendering, especially in conjunction with relational database management systems (RDBMS).

Hardware Environment

Figure 1:
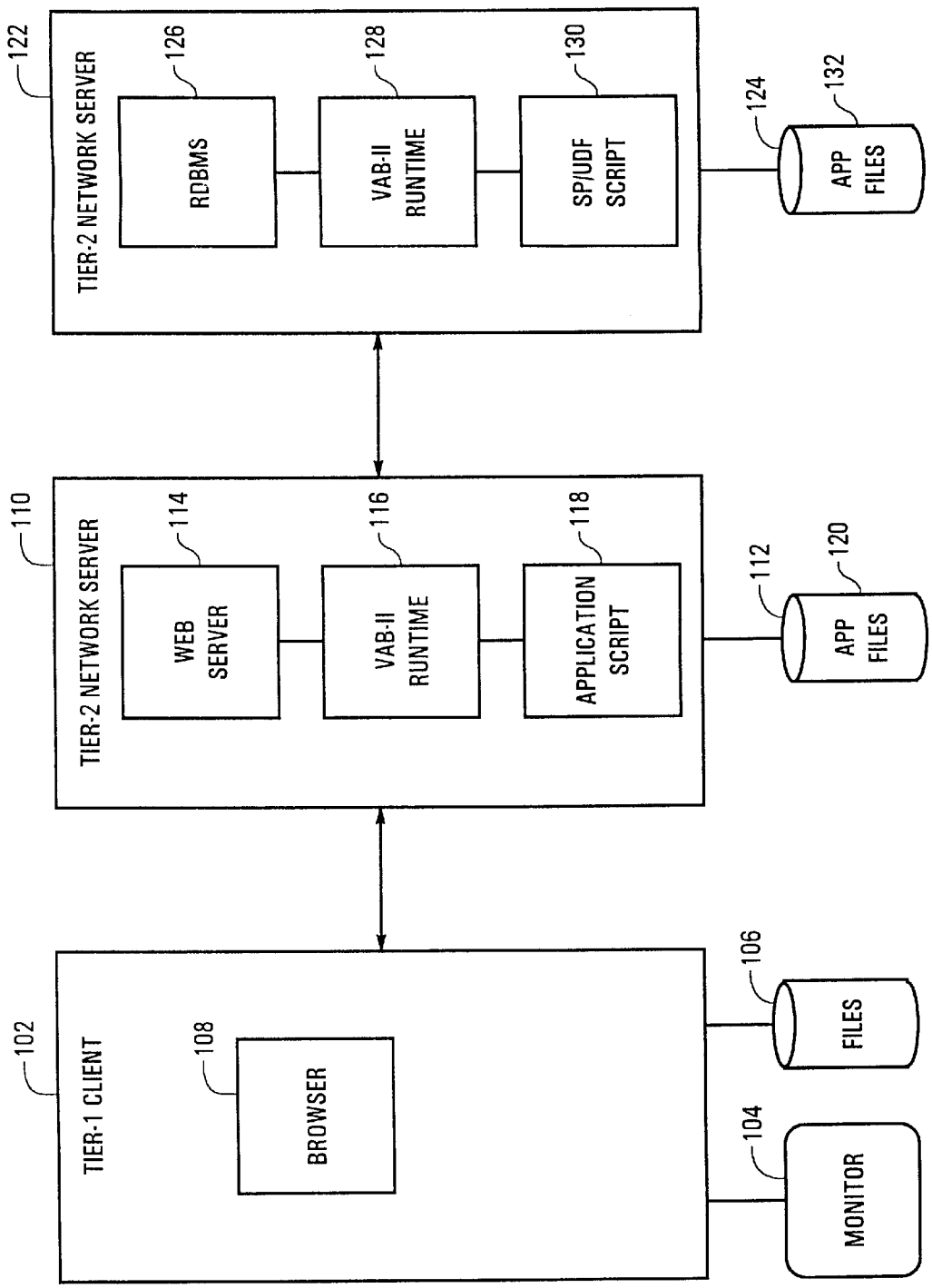
FIG. 1 is a block diagram that illustrates the three tier architecture of the present invention.

FIG. 1 is a block diagram that illustrates the three tier architecture 100 of the present invention. Each of the three tiers shown may be executed on separate computer hardware platforms as shown in FIG. 1, or on a single computer hardware platform, or in some combination thereof.

The first tier comprises a client computer 102 having a monitor 104 and one or more data storage devices 106. In the preferred embodiment, the client computer 102 executes a browser 108 capable of containing and executing applets, such as Microsoft Internet Explorer or Netscape Navigator. The browser 108 communicates with programs on other tiers through HTTP (Hypertext Transfer Protocol).

The second tier comprises a network server 110 having one or more data storage devices 112. In the preferred embodiment, the network server 110 executes a plurality of computer programs including a web server 114, a persistent VAB-II runtime module 116, and one or more application scripts 118 retrieved from an APP file 120 stored on a data storage device 112. The web server 114 (such as IBM, Microsoft, or Netscape HTTP daemons) communicates with the browser 108 and the third tier via HTTP. The VAB-II runtime module 116 executes the application scripts 118 and communicates with the third tier. The application scripts 118 (such as LotusScript scripts) can contain programming logic for communicating with both the browser 108 and the third tier. Preferably, the application scripts 118 include Basic programming instructions, Java, ActiveX, or DLL applet controls, embedded SQL, and other mechanisms known in the art.

The third tier comprises a database server 122 having one or more data storage devices 124 connected thereto. In the preferred embodiment, the database server executes a plurality of computer programs including a relational database management system (RDBMS) 126, a persistent VAB-II runtime module 128, and Stored Procedure (SP) and User Defined Function (UDF) scripts 130 retrieved from an APP file 132 stored on a data storage device 124. The RDBMS 126 (such as IBM's DB2 product) receives requests either directly from tier-2 and/or indirectly from tier-2 via the VAB-II runtime module 128, and then performs the desired database functions. The VAB-II runtime module 128 executes the SP/UDF scripts 130. The SP/UDF scripts 130 comprise programming logic for accessing the database via the RDBMS 126 and communicating with the tier-2 computer programs.

Figure 2:
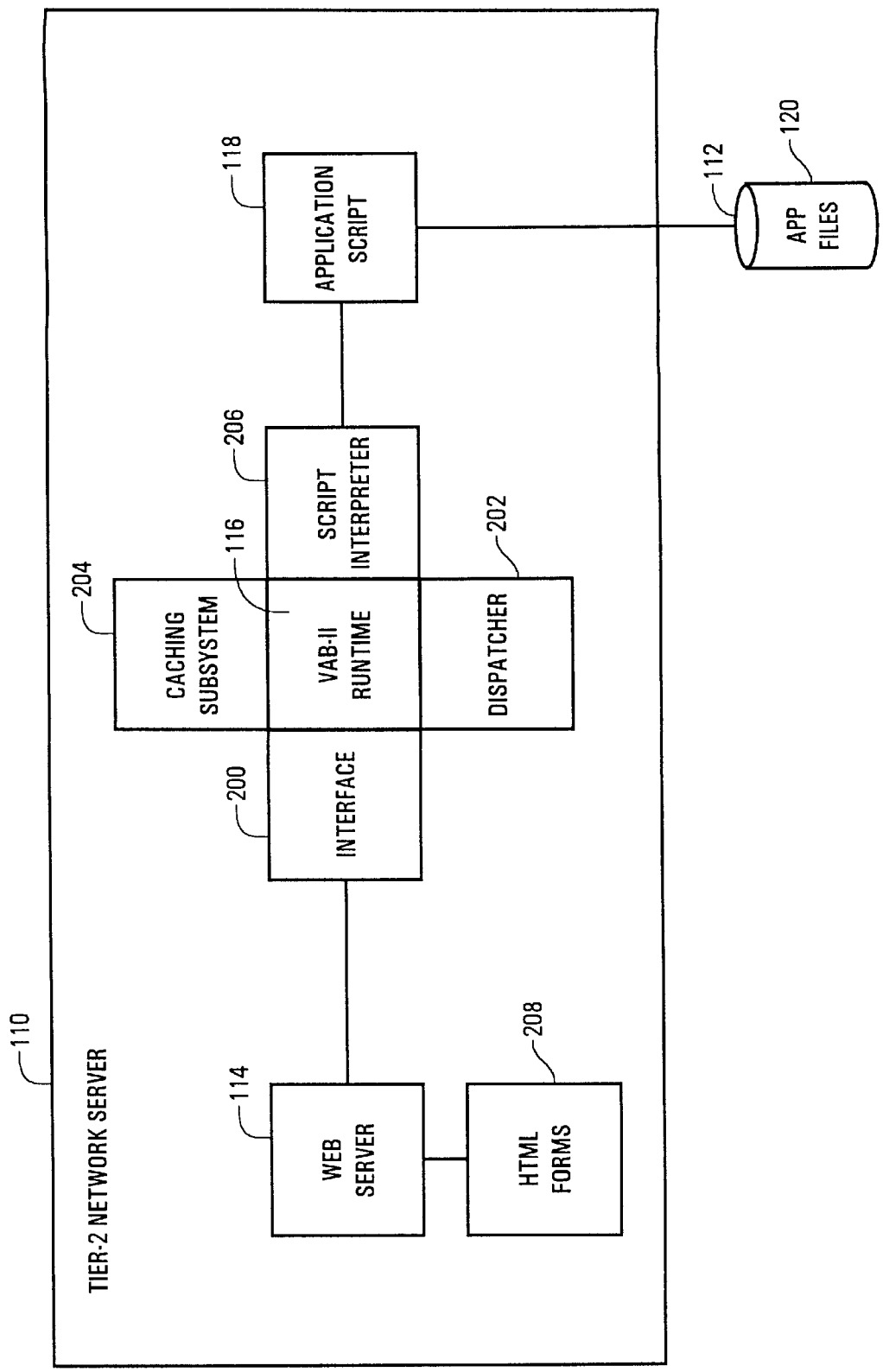
FIG. 2 is a block diagram that further illustrates the components of the network server in the present invention.

FIG. 2 is a block diagram that further illustrates the components of the network server 110 in the present invention. The VAB-II runtime module 116, for example, includes an interface 200 to the web server 114, a dispatcher 202, a caching subsystem 204, and a script interpreter 206 for executing one or more application scripts 118 retrieved from one or more APP files 120 stored on a data storage device 112. The interface 200 takes input from the web server 114 via a Common Gateway Interface (CGI), Netscape Server API (NSAPI), Internet Connection Server API (ICAPI), or some other protocol, and converts it to a form for use by the dispatcher 202. The dispatcher 202 then allocates a thread of the VAB-II runtime module 116 to each incoming request to run the desired application script 118. The caching subsystem 204 exists to help manage special purpose object persistence. The script interpreter 206 executes the application script 118 retrieved from the APP file 120 stored on a data storage device 112.

Figure 3:
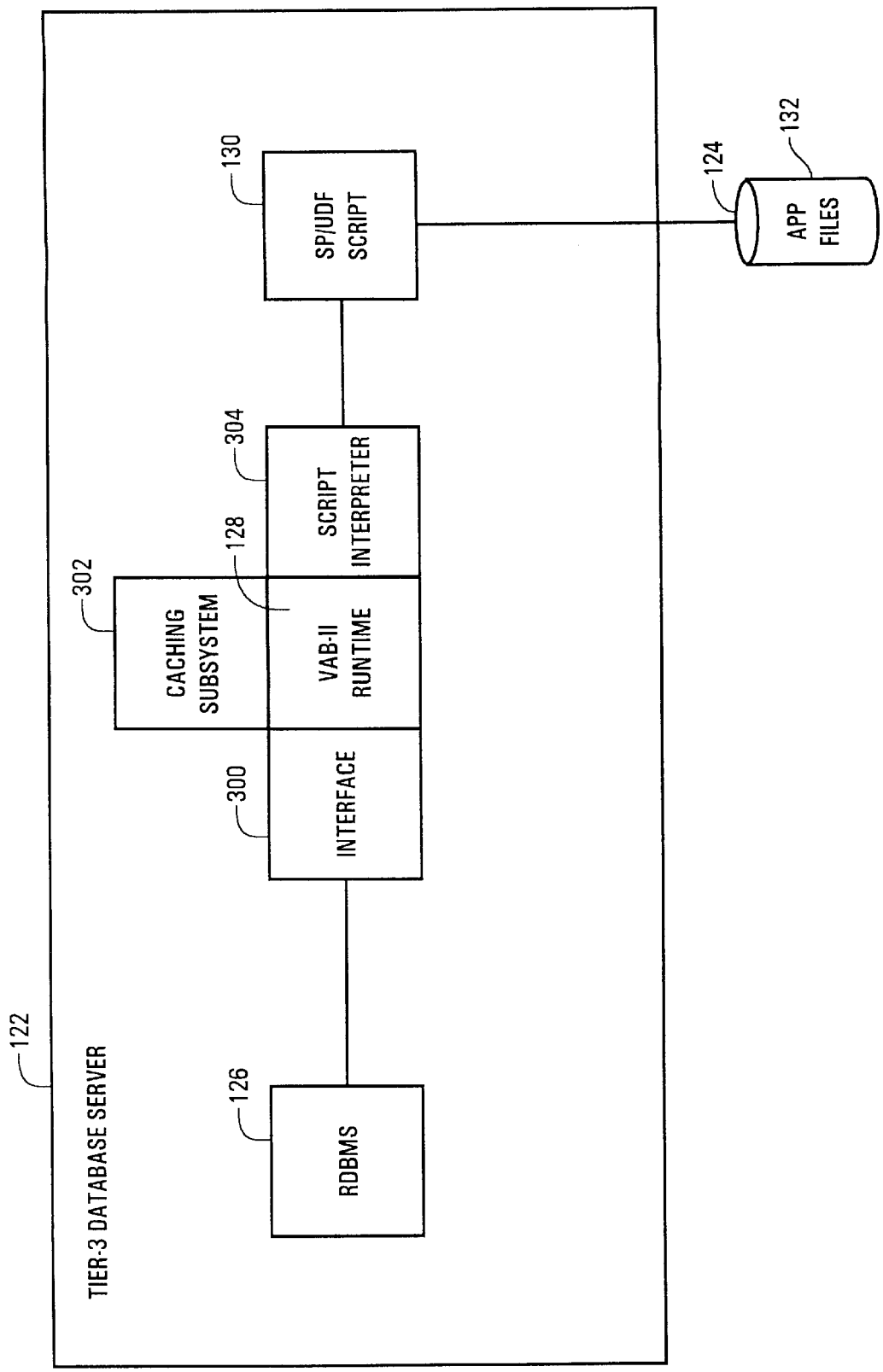
FIG. 3 is a block diagram that further illustrates the components of the database server in the present invention.

FIG. 3 is a block diagram that further illustrates the components of the database server 122 in the present invention. The VAB-II runtime module 128, for example, includes an interface 300 to the RDBMS 126, a caching subsystem 302, and a script interpreter 304 for executing one or more SP/UDF scripts 130 retrieved from one or more APP files 132 store on the data storage device 124. No dispatcher is required for the VAB-II runtime module 128 in the database server 122. The interface 300 provides a mechanism for invoking the database server 126 from the VAB-II runtime module 128 via a dynamic link library (DLL) or some other protocol. As in the network server 110, the caching subsystem 302 exists to help manage special purpose object persistence, although SP/UDF scripts 130 are generally not persistent. The script interpreter 304 executes the SP/UDF script 130 retrieved from the APP file 132.

As indicated above, the computer programs of the three tiers shown may be executed on separate computer hardware platforms or on a single computer hardware platform 134 or in some combination thereof. Each of the computers may each include, inter alia, one or more processors, memory, keyboard, or display, and may be connected locally or remotely to fixed and/or removable data storage devices and/or data communications devices. Each of the computers in each of the tiers also could be connected to other computers via the data communications devices.

Development Environment

Figure 4:
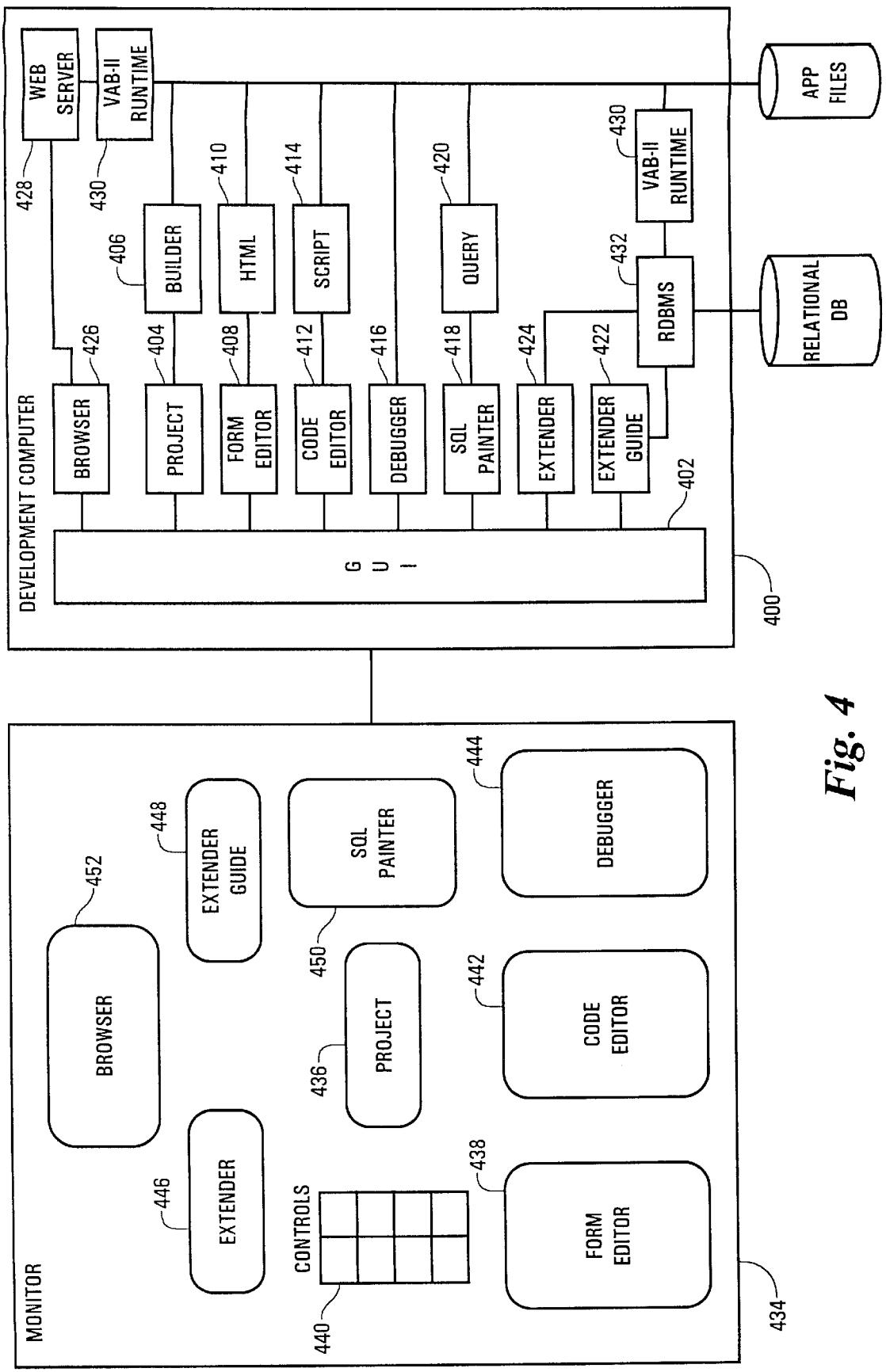
FIG. 4 is a block diagram that illustrates the development environment of the present invention.

FIG. 4 is a block diagram that illustrates the development environment of the present invention. A development computer 400 executes a Rapid Application Development (RAD) tool comprised of a number of different computer programs or modules, including a graphical user interface (GUI) 402, project manager 404 and associated builder 406, form editor 408 for constructing HTML forms 410, code editor 412 for constructing scripts 414, debugger 416, SQL painter 418 for constructing queries 420, RDBMS extender guide 422, and RDBMS extender user interface 424, as well as a browser 426, web server 428, VAB-II runtime module 430, and RDBMS 432. The RAD tool displays a user interface on a monitor 434 attached to the development computer 400, which includes, inter alia, a project window 436, form editor window 438, control pallette 440, code editor window 442, debugging window 444, extender user interface window 446, extender guide window 448, SQL painter window 450, as well as a browser window 452.

As described above, the present invention is typically implemented using a plurality of computer programs, each of which executes under the control of an operating system, such as OS/2, Windows, DOS, AIX, UNIX, MVS, etc., and causes the development computer 400 to perform the desired functions as described herein. Thus, using the present specification, the invention may be implemented as a machine, process, or article of manufacture by using standard programming and/or engineering techniques to produce software, firmware, hardware or any combination thereof.

Generally, the computer programs and/or operating system are all tangibly embodied in a computer-readable device or media, such as memory, data storage devices, and/or data communications devices, thereby making a computer program product or article of manufacture according to the invention. As such, the terms "article of manufacture" and "computer program product" as used herein are intended to encompass a computer program accessible from any computer readable device or media.

Moreover, the computer programs and operating system are comprised of instructions which, when read and executed by the development computer 400, causes the computer 400 to perform the steps necessary to implement and/or use the present invention. Under control of the operating system, the computer programs may be loaded from memory, data storage devices, and/or data communications devices into the memory of the development computer 400 for use during actual operations.

Those skilled in the art will recognize many modifications may be made to this configuration without departing from the scope of the present invention. For example, those skilled in the art will recognize that any combination of the above components, or any number of different components, peripherals, and other devices, may be used with the present invention.

Project Window

Figure 5:
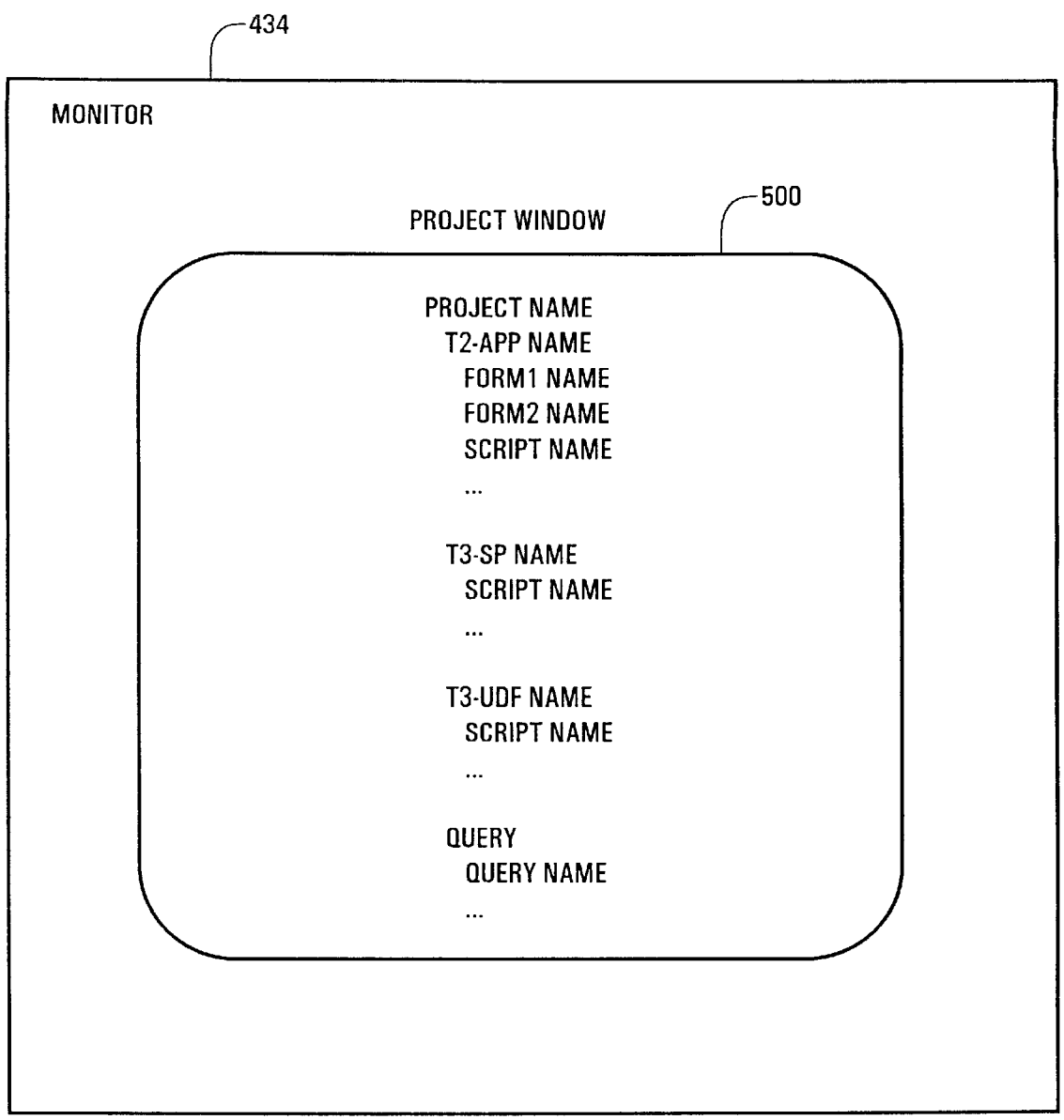
FIG. 5 is a block diagram that further illustrates a project window displayed on the monitor by the development computer according to the present invention.

FIG. 5 is a block diagram that further illustrates a project window 500 displayed on the monitor 434 by the development computer 400 according to the present invention. A tree or outline view of the project is shown, wherein each project and its underlying components are displayed hierarchically. The project name is at the top of the hierarchy, the next level comprises the tier-2, tier-3, and queries, and the final level comprises the components within the tier-2, tier-3, and query levels.

The tree or outline view of the project is represented in the memory of the development computer as an object model and is stored in the APP file. The object model is implemented as a class hierarchy. Instances of the classes in this model contain all the data needed to store the representation of a project for the publish and build functions (discussed below) and for execution during runtime. All other components of the present invention use this object model to maintain the state of the project. In addition, methods on objects in the object model perform common project-related functions needed by components of the present invention.

APP File

Figure 6:
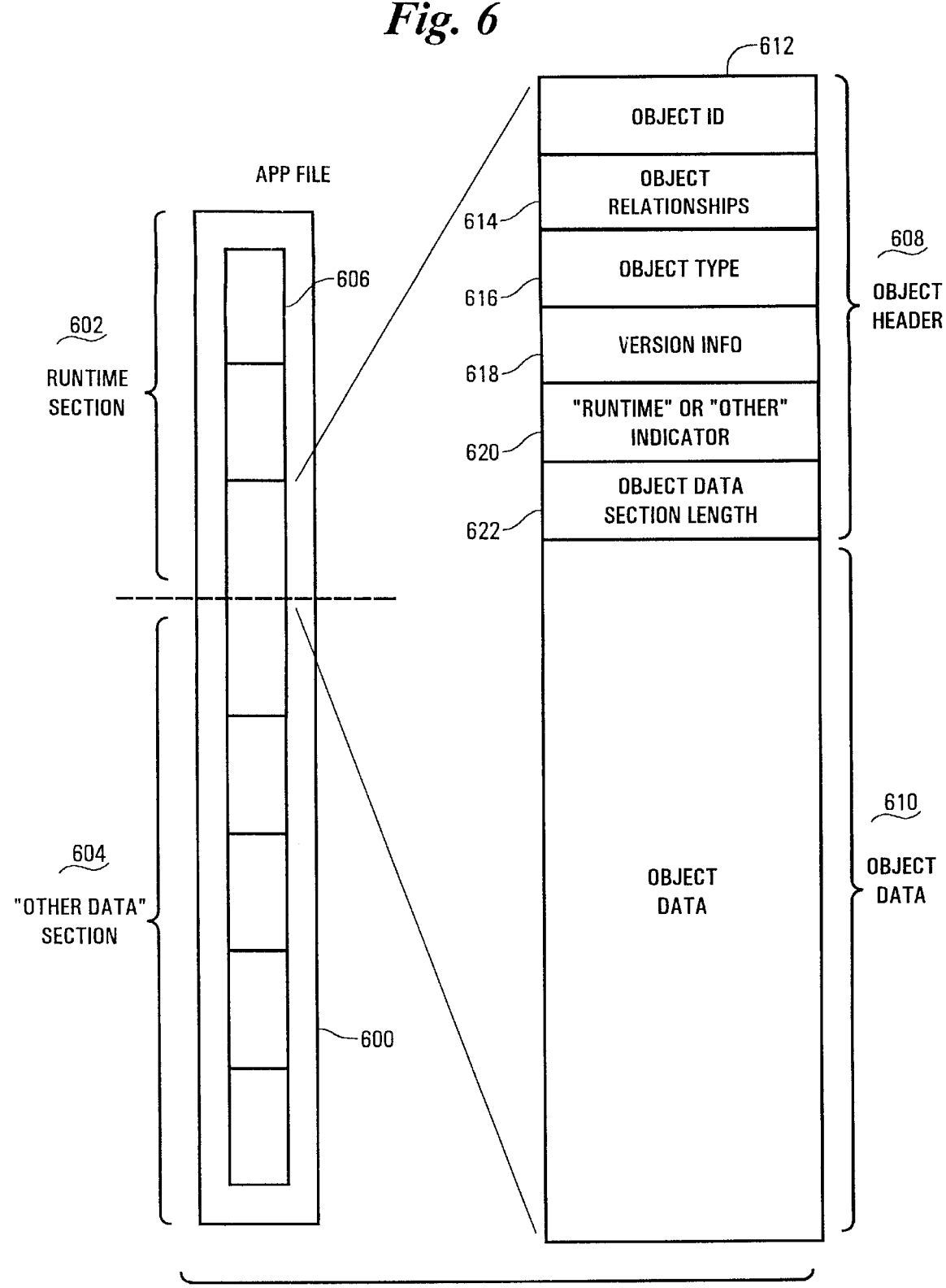
FIG. 6 is a block diagram that illustrates an APP file constructed by the development computer according to the present invention.

FIG. 6 is a block diagram that illustrates an APP file 600 constructed by the development computer 400 according to the present invention. The APP file 600 contains all of the data and structures that represent a software project in the present invention including: project-related data such as information on the application and/or SP/UDF scripts, source code (optionally), event logic controls, forms, and relationships among all of these things.

The APP file 600 encapsulates all of the objects that make up a project. From a single APP file 600, the project and all of its state can be recovered (state also includes such design time behavior as which form is currently active and where in a module the code editor was last positioned before the project was saved). The APP file 600 also enables the present invention to utilize a common mechanism for restoring a project across different development machines, across executables, and across releases.

The APP file 600 describes the persistence mechanism for the Object Model that all components of the present invention are built upon. The APP file 600 comprises two major sections, a Runtime Section 602 and an Other Data section 604.

The Runtime Section 602 contains all of the data needed primarily at "runtime," including executable programming logic, wherein data stored in the Runtime Section 602 is used to quickly and efficiently load information that is used to run an application. The Other Data Section 604 contains all other project related data, including project environment data (such as source code, design time properties, other project development data, etc.). By segmenting the APP file 600 into these two sections, the speed of execution is enhanced, because reading in the Other Data Section 604 can be skipped when executing an application.

Each of the major sections is further segmented into a series of minor sections 606 (a variable number of them), with each minor section containing information about one object in the object model. For example, one minor section 606 may represent the Project object, another minor section 606 could represent a particular Form object within it, etc.

For every object 606 in the Runtime Section 602 or the Other Data Section 604, there is an Object Header 608 and Object Data 610. The Object Header 608 comprises the following types of information: ObjectID 612, Object Relationships 614, Object Type 616, Version Information 618, Runtime Or Other indicator 620, and Object Data Section Length 622.

Since the object model used in the present invention is a tree structure, the APP file 600 must represent this information. A node in a tree can have "n" children and "m" siblings (internally, a sibling relationship may be represented as a singly linked list, in which case a node would appear to have at most one sibling).

When in memory, relationships such as child or sibling can be represented simply by a memory pointer to an object 606. However, when encapsulated inside a APP file 600, pointers to memory have no meaning. The present invention solves this problem by instead representing information describing relationships between objects inside the APP file 600 using Object IDs 612 and Object Relationships 614.

The Object ID 612 is used to store relationships between the objects 606. That is, instead of saving memory pointers in the APP file 600, the relationship is stored. For example, although not stored or interpreted in the English form below, the relationship may comprise the following: "ObjectID-5 has-child ObjectID-19."

The Object Data Section 610 contains a stream of information that has meaning only to the particular Object Type 616. For example, an Object Type 616 of Form will have in its Object Data Section 610 properties of the Form object (such as size, color, etc.). For speed and efficiency, these data are in "stream" format. That is, it is written in an order that is determined by the object 606 and read back in the exact same order (as opposed to writing name-value pairs that could be read and written in any order, but at the expense of extra space and time to parse the information when reading).

As an example of streaming, suppose that an object has property Color=Red and Size=15. The Object Data Section 610 would have "red 15" in it. It is up to the Object Type 616 to know that it wrote the order color then size and must read it back in the same way. An alternative would have been to write "Color=Red, Size=15" into the Object Data Section 610. This alternative would: (1) take up more space, and (2) require that the data be parsed when read. That is, when reading a APP file 600 and reconstructing the Object 606, the data could be read in the reverse order (size then color), because a name-value pair was saved. While more flexible, there is a high performance penalty to be paid for this when large numbers of properties are involved.

From the foregoing, it can be seen that the data structure and use of the APP file 600 has numerous advantages. First, the APP file 600 uses a hybrid format in that it is partly name-value based (the Object Header Section 608) and partly stream based (the Object Data Section 610). This allows for flexibility, very high speed, and low space or storage capacity requirements. In addition, because the data structure of the APP file 600 segments the information into a Runtime Section 602 and an Other Data Section 604, it allows for even higher speed when the APP file 600 is being read for the purpose of executing an application (as opposed to reading an APP file 600 to continue developing the application).

Another advantage of the data structure of the APP file 600 is that the APP file 600 contains all data required for a project. Other development tools typically keep many files that represent a project, resulting in the disadvantages discussed herein. Still another advantage of the APP file 600 is that it contains a persistent representation of the object model, which allows for a common code base among many parts of the present invention.

Dynamic Discovery of Controls

In the present invention, the VAB-II runtime modules 116 or 128 on the network server 110 or database server 122, respectively, can "discover" new controls without the requirement of installing them on the server 110 or 122 (i.e., the server 110 or 122 does not require modification for new controls).

In a preferred embodiment, the creation of dynamically discovered controls occurs at design time when a control is selected from the control pallette or toolbox 440 and placed on an HTML page or form in the form editor window 438, wherein the control may be a label that displays a line of text, a button that when pressed causes the button's click event to be triggered, a listbox that displays a list of selectable items, and other controls that are well known in the art. The development computer 400, through the form editor window 438 and the code editor window 442, allows properties to be set on the control, events programmed for the control, and methods developed that are invoked from other programs.

Normally, a control is implemented as an executable object, such as Microsoft OCX or ActiveX, an IBM/Apple OpenDoc Part, or as a dynamic link library (DLL). These objects must be installed somewhere (either on the client 102 or on the server 110 or 122 and then downloaded to the client 102).

However, the present invention supports a new category of controls that are not necessarily installed on the server 110 or 122 (such as ActiveX) or on the client 102 (such as OpenDoc or OCX). These dynamically discovered controls are encapsulated in the APP file 600 by the builder 406.

When an APP file 600 is executed on tier-2 or tier-3, the existence of a control is extracted from it by the VAB-II runtime module 116 or 128. Therefore, dynamically discovered controls may be found in an APP file 600 without installing the controls on the client 102 or server 110 or 122.

Optionally, a dynamically discovered control may also have an associated Java applet that is used for visual display on the client 102. This applet would be installed on the server 110 or 122 in much the same way as a Microsoft ActiveX applet. However, if the control is "non-visual", this installation step (of the Java applet) can be skipped.

Dynamically discovered controls are accomplished by creating all controls from a common control that supports "introspection". That is, whenever a control is placed on a form in the form editor window 438, it is asked what properties, methods, and events it supports. These are placed in the Object Model, which is written into the APP file 600. When the APP file 600 is to be executed by the VAB-II runtime module 116 or 128 on tier-2 or tier-3, all the necessary information about the control is retrieved from the APP file 600 and no installation or download step is required.

Flowchart

Figure 7:
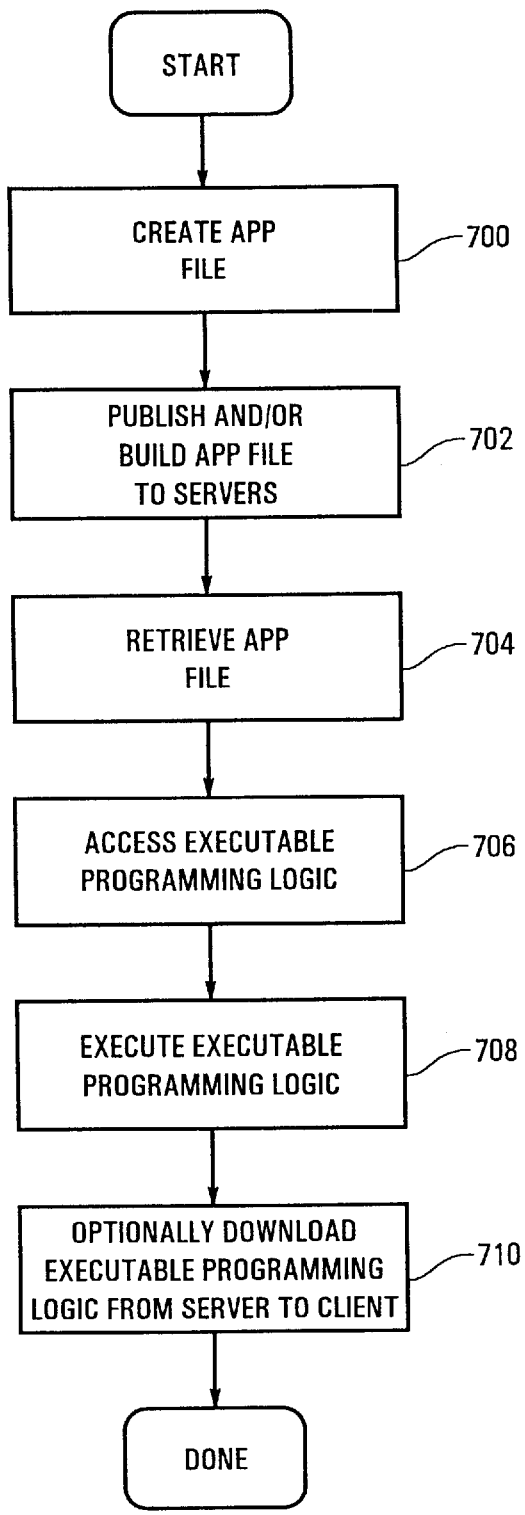
FIG. 7 is a flowchart that illustrates the creation and use of dynamically discoverable controls according to the present invention.

FIG. 7 is a flowchart that illustrates the creation and use of dynamically discoverable controls according to the present invention.

Block 700 represents the development computer 400 creating an application file 600, wherein the application file 600 includes the dynamically discoverable controls as objects.

Block 702 represents the development computer 400 publishing the application file 600 to tier-2 or building the application 600 to tier-3.

Block 704 represents the VAB-II runtime module 116 on the network server 110 or the the VAB-II runtime module 128 on the database server 122 retrieving the application file 600 from a data storage device 112 or 124.

Block 706 represents the VAB-II runtime module 116 on the network server 110 or the the VAB-II runtime module 128 on the database server 122 accessing the executable programming logic stored as an object in the application file 600.

Block 708 represents the VAB-II runtime module 116 on the network server 110 or the the VAB-II runtime module 128 on the database server 122 executing the executable programming logic.

Finally, Block 710 represents the VAB-II runtime module 116 on the network server 110 optionally downloading the executable programming logic for the control to the client 102.

Conclusion

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

In summary, the present invention discloses a method, apparatus, and article of manufacture for providing a programming development environment that supports the development of Internet and Intranet applications. More specifically, the present invention provides for the dynamic discovery of controls by servers, without the requirement that the controls be installed on the server. This is accomplished by encapsulating the executable programming logic for the control as an object in an application file storing the entire software project. The application file is copied to a data storage device of the server, which in turn retrieves the application file, accesses the object containing the executable programming logic, and then executes the executable programming logic.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method of dynamically discovering controls in a computer, comprising the steps of:
   (a) dynamically locating an application file storing one or more data objects therein from a data storage device connected to the computer, wherein one or more of the data objects contains data needed to execute a control without installing the control;
   (b) accessing the data objects in the application file that contain the data needed to execute the control; and
   (c) processing the accessed data objects to execute the control without installing the control.

2. The method of claim 1, further comprising the step of: creating the application file for the control by storing into the application file the data needed to execute the control without loading the control.

3. The method of claim 1, further comprising the step of downloading the data from the application file for the control to another computer by use of one or more data communication devices.

4. The method of claim 2, wherein the application file contains a definition of a software project that may be used to develop the application file in a software development environment.

5. The method of claim 4, further comprising the step of storing the data needed to execute the control without loading the control and storing the definition of the software project into the application file in:
   a first section comprising the data needed to execute the control without installing the control in the computer; and
   a second section for storing the data containing the definition of the software project.

6. The method of claim 5, further comprising the step of storing the data in the first and second sections into a plurality of interrelated data objects.

7. The method of claim 4 above, further comprising the step of storing into the definition of the software project one or more elements selected from a group comprising:
   a project name object;
   a tier-2 application object for execution by a network server;
   a tier-3 stored procedure object for execution by a database server;
   a tier-3 user-defined function object for execution by a database server; and
   a tier-3 query object for execution by a database server.

8. An apparatus for dynamically discovering controls, comprising:
   (a) a computer having a data storage device connected thereto;
   (b) means, performed by the computer, for dynamically locating an application file storing one or more data objects therein from a data storage device connected to the computer, wherein one or more of the data objects contains data needed to execute a control without installing the control;
   (c) means, performed by the computer, for accessing the data objects in the application file containing the data needed to execute the control without installing the control; and
   (d) means, performed by the computer, for processing the accessed data objects to execute the control without installing the control on the computer.

9. The apparatus of claim 8, in which the data from the application file for the control may be downloaded to another computer by use of one or more data communication devices.

10. The apparatus of claim 8, in which the application file for the control contains the data needed to execute the control without loading the control.

11. The apparatus of claim 10, wherein the application file contains a definition of a software project that may be used to develop the application file in a software development environment.

12. The apparatus of claim 11 above, wherein the definition of the software project comprises one or more elements selected from a group comprising:
   a project name object;
   a tier-2 application object for execution by a network server;
   a tier-3 stored procedure object for execution by a database server;
   a tier-3 user-defined function object for execution by a database server; and
   a tier-3 query object for execution by a database server.

13. The apparatus of claim 11, wherein the application file comprises:
   a first section comprising the data needed to execute the control without installing the control in the computer; and
   a second section for storing the data containing the definition of the software project.

14. The apparatus of claim 13, wherein the first and second sections each comprise a plurality of interrelated data objects.

15. An article of manufacture comprising a program storage medium readable by a computer and embodying one or more instructions executable by the computer to perform method steps for dynamically discovering controls, the method comprising the steps of:

(a) dynamically locating an application file storing one or more data objects therein from a data storage device connected to the computer, wherein one or more of the data objects contains data needed to execute a control without installing the control;

(b) accessing the data objects that contain the data needed to execute the control in the application file; and (c) processing the accessed data objects to execute the control without installing the control.

16. The article of manufacture of claim 15, in which the application file for the control contains the data needed to execute the control without loading the control.

17. The article of manufacture of claim 15, in which the data from the application file for the control may be downloaded to another computer by use of one or more data communication devices.

18. The article of manufacture of claim 16, wherein the application file contains a definition of a software project that may be used to develop the application file in a software development environment.

19. The article of manufacture of claim 18, further comprising the step of storing the data needed to execute a control without loading the control and storing the definition of the software project into the application file in:

a first section comprising the data needed to execute the control without installing the control in the computer; and a second section for storing the data containing the definition of the software project.

20. The article of manufacture of claim 19, further comprising the step of storing the data in the first and second sections into a plurality of interrelated data objects.

21. The article of manufacture of claim 18 above, wherein the definition of the software project comprises one or more elements selected from a group comprising:

a project name object;

a tier-2 application object for execution by a network server;

a tier-3 stored procedure object for execution by a database server;

a tier-3 user-defined function object for execution by a database server; and a tier-3 query object for execution by a database server.

* * * * *